(12) United States Patent  
Graves

(10) Patent No.: US 7,360,807 B2  
(45) Date of Patent: Apr. 22, 2008

(54) SEALS

(75) Inventor: Daniel Graves, Kent (GB)

(73) Assignee: ITW Limited, Berkshire (GB)

( * ) Notice: Subject to any disclaimer, the term of this patent is extended or adjusted under 35 U.S.C. 154(b) by 0 days.

(21) Appl. No.: 11/017,218

(22) Filed: Dec. 21, 2004

(65) Prior Publication Data

US 2005/0161958 A1 Jul. 28, 2005

(30) Foreign Application Priority Data

Dec. 22, 2003 (GB) ................................ 0329665.4

(51) Int. Cl.
*G09F 3/03* (2006.01)
*B65D 27/30* (2006.01)
(52) U.S. Cl. .................. 292/307 R; 292/319; 292/323
(58) Field of Classification Search ............ 292/307 R, 292/316, 317, 319 X, 318, 320, 321, 323 X, 292/307 A, 307 B; 24/399, 388, 400, 30.5 R; 206/440, 484, 216, 807
See application file for complete search history.

(56) References Cited

U.S. PATENT DOCUMENTS

| | | | |
|---|---|---|---|
| 88,959 A | 4/1869 | Hopkins | |
| 140,486 A | 7/1873 | Dunn | |
| 147,219 A | 2/1874 | Ahrend | |
| 306,524 A | 10/1884 | Reeve | |
| 341,585 A | * 5/1886 | Leschziner | .................. 108/68 |
| 380,446 A | 4/1888 | Meise | |
| 954,271 A | 4/1910 | Edgar | |
| 1,867,689 A | 7/1932 | Leer | |
| 1,937,743 A | 12/1933 | Brooks | |
| 1,948,255 A | 2/1934 | Brooks | |
| 2,655,805 A | 10/1953 | Fletcher | |
| 3,149,869 A | 9/1964 | Chamberlin | |
| 3,330,586 A | 7/1967 | Becker | |
| 3,338,285 A | * 8/1967 | Jaster et al. | .................. 383/65 |
| 3,372,952 A | 3/1968 | Newton | |
| 3,380,267 A | 4/1968 | Winchester | |
| 3,591,223 A | 7/1971 | Castro Neto | |
| 4,082,336 A | 4/1978 | Natkins | |
| 4,106,801 A | 8/1978 | De Lima Castro Neto | |
| 4,106,802 A | 8/1978 | Lozio | |
| 4,175,782 A | 11/1979 | De Lima | |

(Continued)

FOREIGN PATENT DOCUMENTS

DE 341824 10/1921

(Continued)

*Primary Examiner*—Jennifer H. Gay  
*Assistant Examiner*—Mark Williams

(57) ABSTRACT

The application describes breakable seal for a container, bag, pouch or reusable envelope which is closed by one part (2) locating over a second part (1), the second part (1) having an opening (7) for receiving the head (14) of the breakable seal (13) which locks into the opening in such a manner that it cannot be removed without breaking, the seal (13) in its inserted position locking the first part (2) in place over the second part (1) in a tamper evident fashion. The seal (13) has an extended neck portion (15*b*) between the line of weakness (18) and the main body part (15*a*) of the seal. Typically said one part (2) is the fastener tab of the zipped opening of a reusable envelope and the second part (1) is the enclosure or chamber of a lock unit mounted on the envelope, adjacent one end of the zipped opening.

11 Claims, 4 Drawing Sheets

U.S. PATENT DOCUMENTS

| | | | |
|---|---|---|---|
| 4,221,025 A | 9/1980 | Martens et al. | |
| 4,299,417 A | 11/1981 | McClure | |
| D264,766 S | 6/1982 | Huff | |
| 4,342,477 A | 8/1982 | McClure | |
| 4,505,503 A | 3/1985 | LaMontagne | |
| 4,512,599 A * | 4/1985 | De Lima Castro Netto | 292/307 R |
| 4,715,728 A * | 12/1987 | Sfikas | 383/9 |
| 4,736,451 A * | 4/1988 | Ausnit | 383/65 |
| D297,423 S | 8/1988 | Kong | |
| 5,020,342 A | 6/1991 | Doan et al. | |
| 5,064,231 A | 11/1991 | Mangone, Jr. | |
| 5,230,541 A | 7/1993 | Nowak | |
| 5,365,757 A | 11/1994 | Primeau | |
| 5,421,177 A | 6/1995 | Sieber et al. | |
| 5,522,627 A | 6/1996 | Swift | |
| 5,762,386 A | 6/1998 | Fuehrer | |
| 5,782,513 A | 7/1998 | Nazzari | |
| D405,723 S | 2/1999 | Anscher | |
| 6,030,122 A * | 2/2000 | Ramsey et al. | 383/61.2 |
| 6,264,033 B1 * | 7/2001 | Kannabiran et al. | 206/459.1 |
| 6,471,058 B2 * | 10/2002 | Kannabiran et al. | 206/459.1 |
| 6,511,108 B1 | 1/2003 | Roessner et al. | |
| 6,533,335 B2 | 3/2003 | Hudson | |
| 6,578,887 B1 | 6/2003 | Kienzler | |
| 6,749,235 B1 | 6/2004 | Crisp | |
| 6,789,946 B2 * | 9/2004 | Plourde et al. | 383/63 |
| 6,918,620 B2 | 7/2005 | Crisp | |
| 7,118,144 B2 | 10/2006 | Anderson | |
| 2004/0012211 A1 | 1/2004 | Burt | |
| 2004/0047520 A1 | 3/2004 | Winpenny | |
| 2005/0161958 A1 | 7/2005 | Graves | |

FOREIGN PATENT DOCUMENTS

| | | |
|---|---|---|
| EP | 0223905 | 6/1987 |
| GB | 1424680 | 2/1976 |
| GB | 2115354 A | 9/1983 |
| GB | 2364967 A | 2/2002 |
| GB | 2362430 A | 4/2007 |
| JP | 2000177753 A | 6/2000 |
| WO | 96/28804 | 9/1996 |
| WO | 97/48603 | 12/1997 |
| WO | 0186615 A2 | 11/2001 |
| WO | 02/16215 | 2/2002 |
| WO | 2004017280 A | 2/2004 |

* cited by examiner

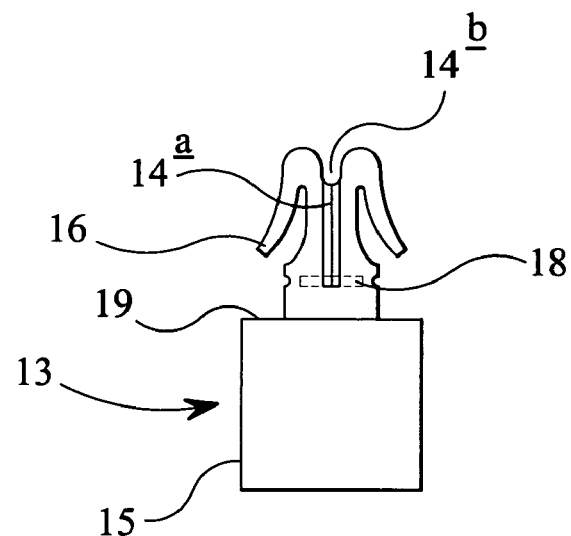
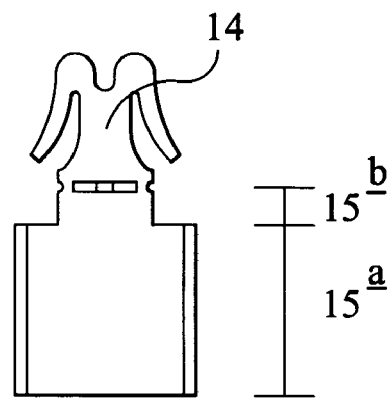
FIG 2a  FIG 2b
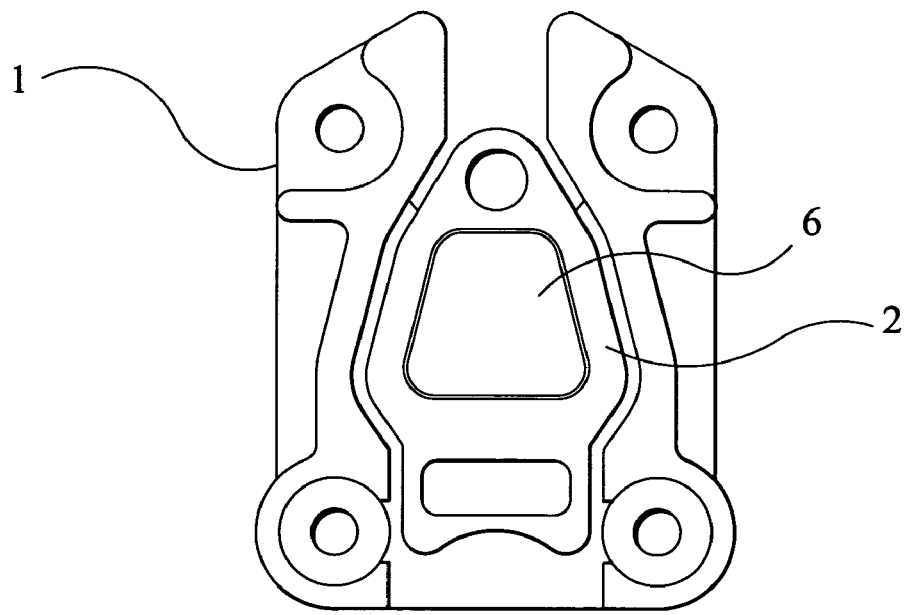
FIG 3

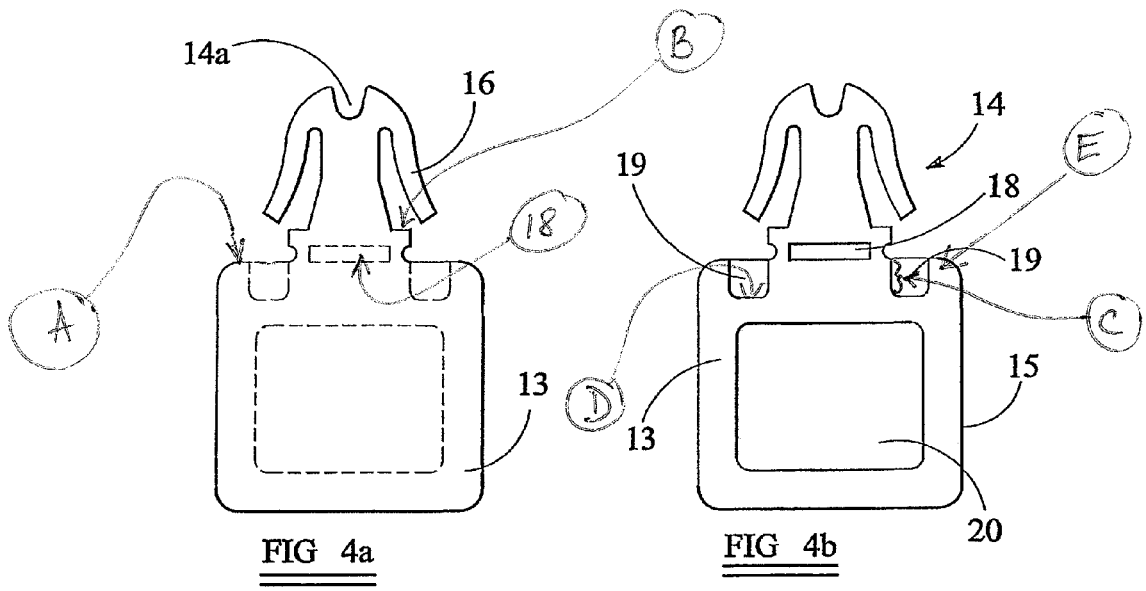
FIG 4a
FIG 4b
*Exhibit A*
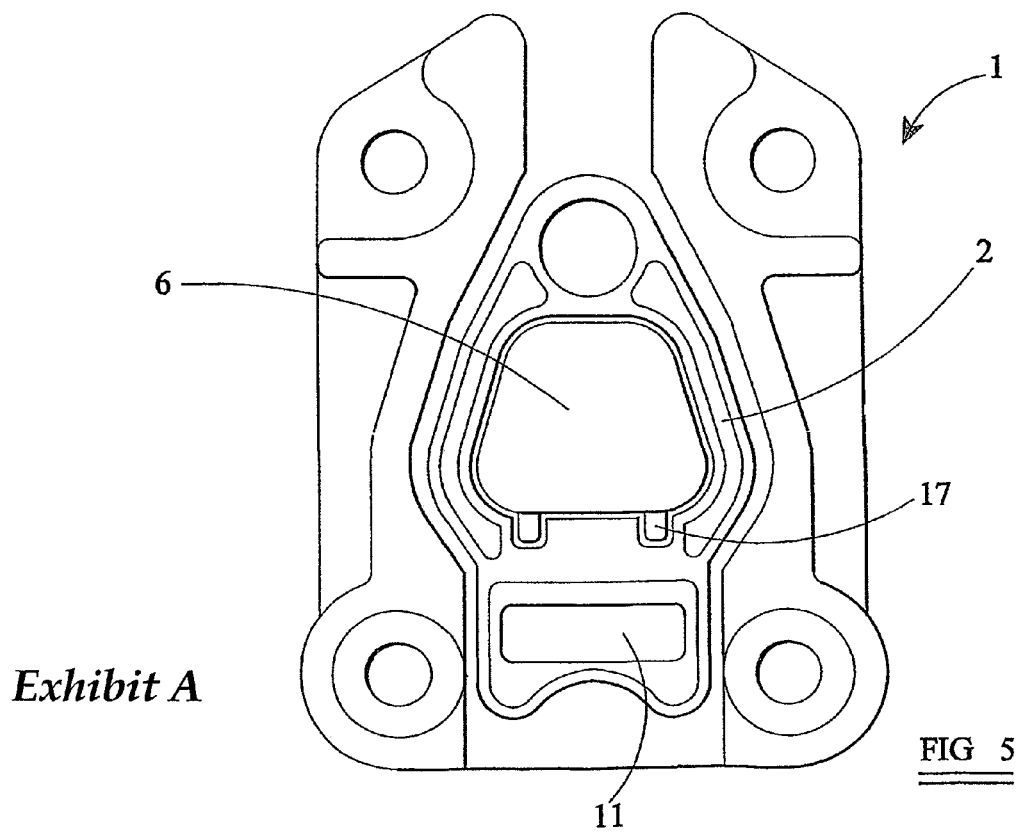
FIG 5

SEALS

RELATED APPLICATIONS

The present application is based on, and claims priority from, UK Application Number 0329665.4, filed Dec. 22, 2003, the disclosure of which is hereby incorporated by reference herein in its entirety.

FIELD OF THE INVENTION

The invention relates to a disposable locking member (a "seal") for closeable container, for example a bag, pouch or reusable envelope, which has an opening which can be closed. The container has a lock unit at the opening which cooperates with the disposable locking member, to close the container.

BACKGROUND OF THE INVENTION

The invention is, for example, concerned with the type of container described in GB-A-1424680. In this reference, an envelope with a zipped opening is described. At one end of the zipped opening is mounted the lock unit, this lock unit having a raised housing or chamber with an opening on one side. The fastener tab of the zip has a central aperture so that it can fit over the chamber and then a disposable sealing element (known for simplicity as a "seal") is pushed into the chamber to lock the fastener tab in place and thus lock the zipped opening. The seal is a substantially flat element, moulded from a suitable plastics material, which has a head part and a body part. Between these two parts is a weakened or frangible section and it is the head part which locks into the chamber by means of the resilient barbs of an arrowhead configuration. The dimensions of the seal are such that the weakened or frangible section is at the mouth of the chamber. The seal cannot then be removed whole from the chamber and must be broken in order to release the fastener tab of the zip. The lock unit and disposable seal thus provide tamper evidence to the container. Such a tamper evident container (zipped envelope) is shown in FIG. 6, labelled "prior art".

For the avoidance of any doubt, while the invention is concerned with a zipped envelope of the type discussed above, the invention which is set out below is also applicable to other types of containers where one part (lid, flap etc) can cooperate with another part (the main body of the container, for example) which has a lock unit.

SUMMARY OF THE INVENTION

The aim of the invention is to provide a new locking member for a closeable container, such as a zipped pouch or envelope.

According to the invention, there is provided a breakable and disposable seal for a container, bag, pouch or envelope which is closed by one part locating over a second part, the second part having an opening for receiving part of the breakable seal which locks into the opening in such a manner that it cannot be removed without breaking, the seal in its inserted position locking the first part in place over the second part in a tamper evident fashion, wherein the seal comprises a head part and a body part, the head part in use locating in the opening of the said second part and a line of weakness delimiting the head part from the body part, and wherein the body part has a neck portion which is substantially narrower than a main portion, the neck portion extending between the line of weakness and the main portion, shoulders being defined at the juncture of the neck portion and main portion so that in use a gap exist between the mouth of the opening and the said shoulders when the seal is inserted in the second part.

Typically, the said one part is the fastener tab of the zipped opening of a reusable envelope and the second part is the enclosure or chamber of a lock unit mounted on the envelope, adjacent one end of the zipped opening.

Preferably the head part of the seal is formed with a groove for location over a corresponding rib within the second part or chamber. Alternatively, the chamber could include a groove into which a rib on the seal locates.

The long neck of the seal provides for easy removal of the seal and allows use of the seal in lock units which are damaged, for example damage which creates irregular protrusions at the opening of the lock unit. It has surprisingly been found that such advantages can be achieved without significantly compromising security. The design of the long neck of the seal goes against conventional thinking in this art, which tended to assume that the shoulders of the seal should be as close as possible to the opening of the lock unit thereby eliminating any gap which might facilitate tampering.

BRIEF DESCRIPTION OF THE DRAWINGS

A preferred embodiment of the invention is described in more detail below, with reference to the accompanying figures, wherein:

FIGS. 2a and 2b are top and bottom views of a seal according to one embodiment of the invention to be used with the lock unit of FIG. 1;

FIG. 3 is a top view showing the zip fastener tab in place on the lock unit;

FIG. 4 is a plan view similar to that of FIG. 3 but showing the seal located in the lock unit;

FIGS. 5a and 5b are explanatory sectional views of the seal and part of the lock unit, showing the location of the seal in the chamber of the lock unit.

DETAILED DESCRIPTION OF PREFERRED EMBODIMENTS

Figure 1:
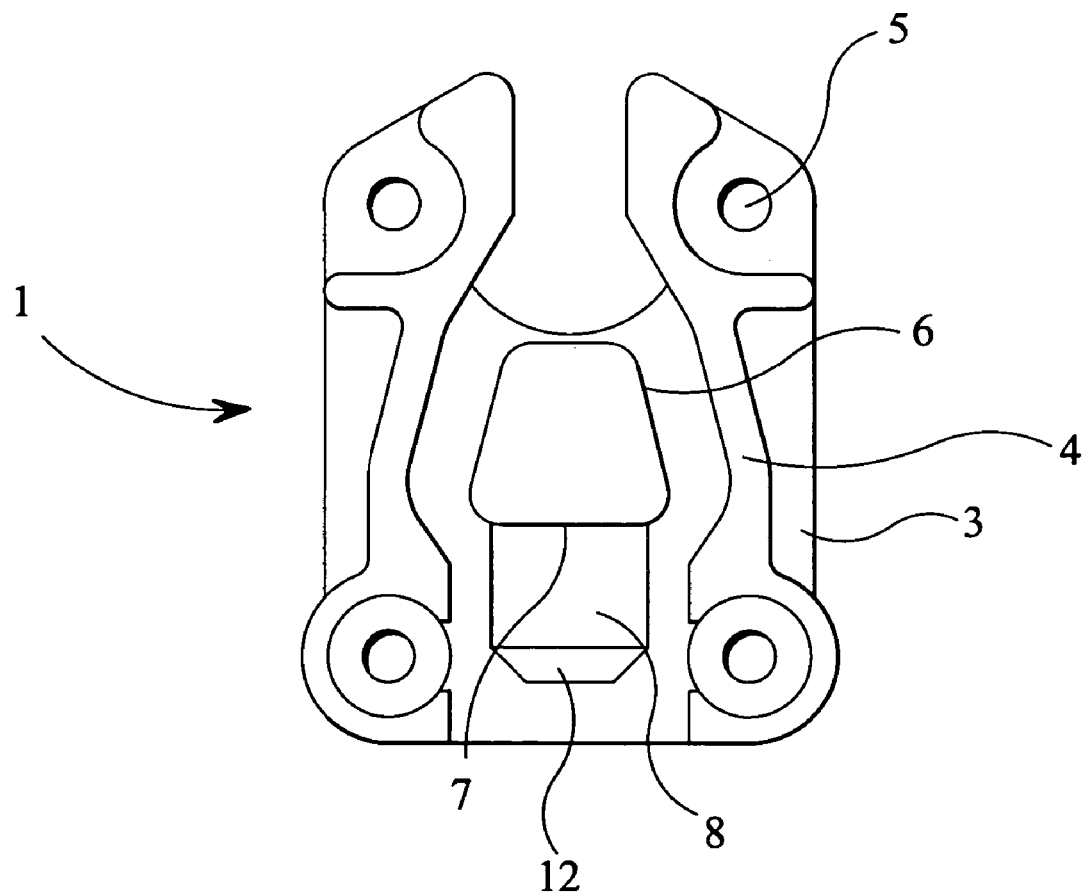
FIG. 1 shows in plan view the lock unit and fastener tab of a zipped reusable envelope for use with a locking member or seal according to one embodiment of the invention, the envelope not being shown.
Figure 6:
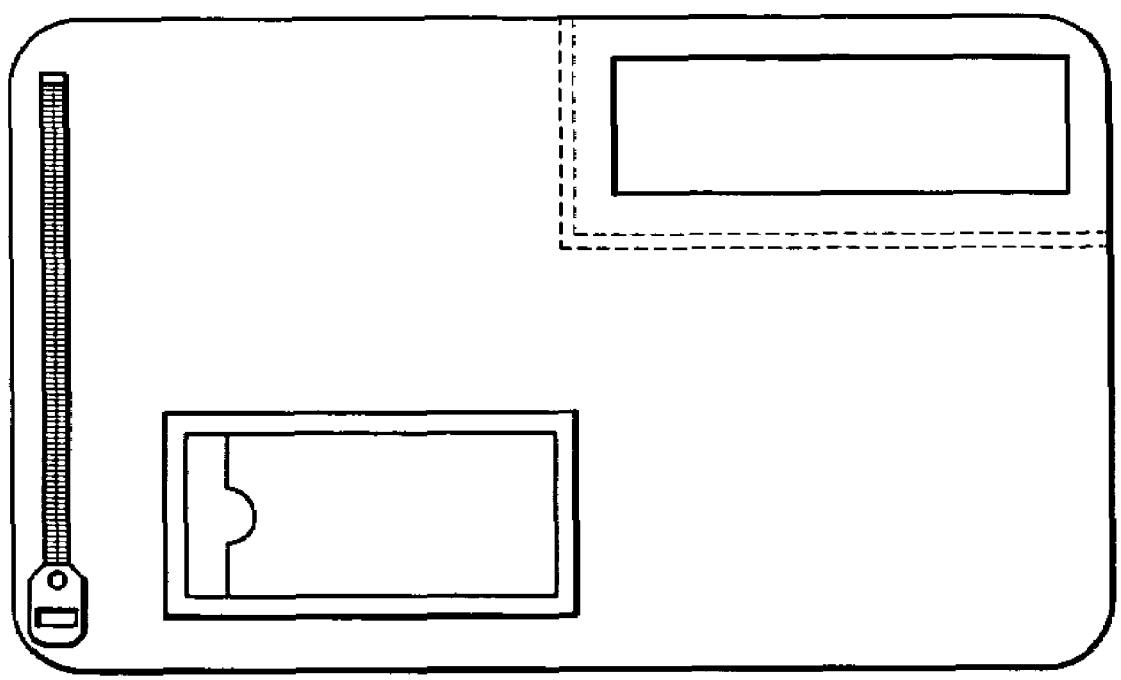
FIG. 6 is a view of a conventional zipped envelope with a lock unit.

FIG. 1 shows the lock unit 1 and fastener tab 2. The lock unit has a flat base 3 with a raised wall 4 which defines a seat for the fastener tab 2. The base has a series of apertures 5 which receive rivets which fix the lock unit on the material of the bag or envelope. Within the wall of the lock unit 1 there is a raised enclosure or chamber 6 which has at one side (the lower side as seen in FIG. 1) an opening 7. The base has a depression 8 which communicates with the chamber, to allow the broken part of the seal to be shaken out of the chamber in known fashion.

The fastener tab 2, in this embodiment, has three apertures 9, 10, 11. Aperture 9 is for connection with the zip puller, in known fashion; aperture 10 has a shape which corresponds to that of the chamber 6, to allow the fastener tab to locate over the chamber; the aperture 11 locates on a raised catch 12 on the base part of the lock unit, again in a known fashion.

FIGS. 2a and 2b shows the disposable and frangible seal 13 according to this embodiment of the invention. The seal 13 is substantially flat and has a head part 14 and body part 15. The head part has an arrowhead configuration with resilient barbs 16, in a known fashion. Between the body part and head part is a line of weakness 18 formed by an elongate recess (seen most clearly in the bottom view of FIG. 2b) which provides for the breakable connection between the head and body parts. The body 15 includes a main part or trunk 15a which in this embodiment is substantially square (it could be of any other desired shape). Between this main part 15a and the line of weakness 18 is a narrowed neck 15b. At the juncture of the neck 15b and main part 15a there are shoulders 19. The neck 15b extends away from the line of weakness 18 (and thus in use from the chamber mouth 7) for a significant distance, for example 1.5 mm to 4 mm preferably 2 mm to 2.5 mm. The overall dimensions of the seal are typically about 22 mm long by 11 mm wide by 2.5 mm thick. The thickness of the head is typically 2.0 mm. The body could be thinner or thicker. The neck preferably has parallel sides, i.e. it is straight rather than tapered, but it could be tapered and/or curved.

A further preferred feature of the seal is a longitudinal groove 14a along the head part 14. The head of the seal also has an indent 14b at its tip.

To close the bag or envelope the fastener tab 2 is located on the chamber 6 of the lock unit 1 in a known fashion. This position is shown in FIG. 3. It can be noted in particular that the aperture 10 of the fastener tab registers with the chamber, while the aperture 11 locates on the raised catch 12 of the base of the locking unit.

To finally lock the envelope in a tamper evident fashion, the seal 13 shown in FIG. 2 is pushed into the chamber 6, the head part 14 of the seal locating within the chamber and in particular the resilient barbs 16 locating behind the chamber walls, so that the seal cannot be removed without breaking the body part 15 from the head part 14. In this position, the body 15 of the seal overlaps part of the tab 2. The locked condition of the envelope is shown in FIG. 4, the inner wall of the chamber being shown in dashed lines. The line of weakness 18 of the seal is at the opening 7 of the chamber 6. FIG. 4 shows the location of the groove 14a along the head part of the seal over an inner rib 21 on the inside of the chamber (i.e. on the "roof" of the chamber). The indent 14b locates on a lug 22 at the back of the chamber.

The sectional views of FIGS. 5a and 5b shows the seal 13 approaching the chamber 6 (FIG. 5a) and then the seal located within the chamber (FIG. 5b). It can be noted that the opening 7 of the chamber is tapered, that is the edge 23 of the wall of the chamber above the opening is inclined with respect to the plane of the base 3 of the lock unit. This feature allows a close tolerance to be achieved between the thickness of the seal 13 and the top of the opening 7, while at the same time the tapered shape provides no hindrance to the seal being inserted.

To open the envelope, the seal is broken along the line of weakness 18 and the body part 15 is removed in a known fashion (this removal providing tamper evidence of unauthorised opening). The neck 15b of the seal facilitates this breaking and removal. The head 14 of the seal is shaken out from the lower part of the chamber which communicates with the depression 8 in the base 3 of the lock unit. This depression extends the width of the chamber, beneath the shoulders, so that the width of the depression is greater than the width of the opening 7 which initially receives the head of the seal.

The lock unit may be formed of a suitable material, such as hardened steel, or of plastics such as nylon, polypropylene, ABS, styrene or engineering plastics. The disposable seals, which will generally be supplied in bulk, are formed of a suitable resilient but frangible plastics material, such as styrene, ABS, nylon or polypropylene.

Although the invention has been described with reference to a zipped envelope it is equally relevant to other types of containers. For example, the container could have a flap with an aperture which registers with a lock unit on the main part of the container, the seal then going into the lock unit to secure the flap in place.

The invention claimed is:

1. A breakable and disposable seal for use with a seal receiving chamber for sealing a container, said seal comprising: a head part and a body part spaced from the head part in a longitudinal direction of said seal by a line of weakness, said head part having an upper surface and a lower surface, said upper surface and said lower surface defining a thickness therebetween in a thickness direction perpendicular to the longitudinal direction, and said upper surface defining a longitudinally elongated and central groove, wherein, along said longitudinally elongated and central groove, said thickness is non-zero and less than the thickness in a remaining region of said head part, said remaining region located outside said groove, wherein the body part has a main portion, and a neck portion which is substantially narrower than the main portion and extends between the line of weakness and the main portion, with shoulders being defined at the juncture of the neck portion and the main portion; and wherein said longitudinally elongated and central groove defines a straight and a substantially narrow path along a central axis, thereby connecting a forwardmost part of said head part and said line of weakness;

wherein the longitudinally elongated and cantral groove registers with a corresponding rib whithin the seal receiving chamber.

2. A seal according to claim 1, wherein the neck portion has substantially parallel straight sides.

3. A seal according to claim 1, wherein the length of the neck portion is from 1.5 to 4 mm.

4. A seal according to claim 1, wherein the length of the neck portion is from 2 to 2.5 mm.

5. A seal according to claim 1, wherein each of said shoulders having a substantially flat front surface adjoining said thickness of said head part, wherein said front surface of each of said shoulders extends orthogonally to said neck portion and defines an edged corner for said main portion by immediately bending towards said main portion away from said neck portion.

6. A seal according to claim 5, wherein a mouth of the opening and said front surface of each of said shoulders define an uninterrupted gap in between, thereby, locating an entirety of the main portion away from said mouth of the opening when the seal is inserted in the seal receiving chamber.

7. The seal according to claim 1, wherein an entirety of said upper surface and an entirety said lower surface are parallel to each other except for the longitudinally elongated and central groove.

8. A breakable and disposable seal for use with a seal receiving chamber for sealing a container, said seal comprising:

a main portion;

a neck portion which is narrower than said main portion and extends forwardly from said main portion in a longitudinal direction of said seal;

a weakened portion which is different from and extends forwardly from said neck portion in said longitudinal direction;

a head part insertable through an opening of the chamber and lockingly receivable in the chamber, said head part extending forwardly from said weakened portion in said longitudinal direction and including a longitudinally elongated and central groove, wherein said groove extends rearwardly in the longitudinal direction into the weakened portion, wherein said main portion and said neck portion together define a body part separated from said head part by said weakened portion; wherein the longitudinally elongated and central groove registers with a corresponding rib within the seal receiving chamber.

9. A seal according to claim 8, wherein said neck portion has a physical strength higher than said weakened portion, and further has a longitudinal extent in the longitudinal direction greater than said weakened portion.

10. A seal according to claim 8, wherein shoulders are defined at the juncture of the neck portion and the main portion and a front surface of each of said shoulders extend substantially over a full width of said main portion, and said front surface of said shoulders forms forwardmost parts of said main portion.

11. A breakable and disposable seal for use with a seal receiving chamber for sealing a container, said seal comprising:

a main portion;

a neck portion which is narrower than said main portion and extends forwardly from said main portion in a longitudinal direction of said seal;

a weakened portion different from and extends forwardly from said neck portion in said longitudinal direction; and a head part insertable through an opening of the chamber and lockingly receivable in the chamber, said head part extending forwardly from said weakened portion in said longitudinal direction;

wherein said main portion and said neck portion together define a body part separated from said head part by said weakened portion;

wherein said neck portion has a physical strength higher than said weakened portion, and further has a longitudinal extent in the longitudinal direction greater than said weakened portion;

wherein shoulders being defined at the juncture of the neck portion and the main portion are forwardmost parts of said main portion, and said shoulders are entirely located rearwardly of said neck portion;

wherein the head part comprises;

a longitudinally elongated and central groove for registration with a corresponding rib within the chamber; and two locking barbs on opposite sides of said groove; and wherein said longitudinally elongated and central groove extends from an indent formed on said head part up to said weakened portion.

\* \* \* \* \*